United States Patent

Tsang et al.

[11] Patent Number: 5,561,843
[45] Date of Patent: Oct. 1, 1996

[54] MOBILE RADIO COMMUNICATIONS SYSTEM

[75] Inventors: Ronald P. C. Tsang, Plano; Steven J. Willhoff, Richardson, both of Tex.

[73] Assignee: Northern Telecom Limited, Quebec, Canada

[21] Appl. No.: 407,163

[22] Filed: Mar. 21, 1995

[51] Int. Cl.⁶ .................. H04Q 7/00; H04Q 9/00
[52] U.S. Cl. ............... 455/33.1; 455/34.1; 455/34.2
[58] Field of Search .................. 455/33.1, 34.1, 455/34.2, 54.1, 54.2, 56.1, 62; 379/58, 59

[56] References Cited

U.S. PATENT DOCUMENTS

| | | | |
|---|---|---|---|
| 5,134,709 | 7/1992 | Bi et al. | 455/33.1 |
| 5,218,618 | 6/1993 | Sagey | 455/33.1 |
| 5,280,630 | 1/1994 | Wang | 455/56.1 |
| 5,345,596 | 9/1994 | Buchenhorner et al. | 455/33.1 |
| 5,437,054 | 7/1995 | Rappaport et al. | 455/33.1 |

Primary Examiner—Reinhard J. Eisenzopf
Assistant Examiner—Gertrude Arthur
Attorney, Agent, or Firm—Lee, Mann, Smith, McWilliams, Sweeney & Ohlson

[57] ABSTRACT

A mobile communications system accommodating both expanded spectrum (ES) mobiles and non-expanded spectrum (NES) mobiles incorporates a first set of (ES) channels and a second set of (NES) channels. A proportion of the channel requests from ES mobiles are allocated to a queue for NES channels. NES channels are allocated to these ES mobiles until no further NES resources are available. Further requests from ES mobiles in the NES channel queue are then met by allocating available ES channels. This provides an enhanced efficiency of utilisation of channel resources. Advantageously, a subset of NES channels is reserved for preferential use by NES mobiles to ensure fair allocation of channels between the two types of user, these channels being allocated to ES mobiles only if no other channels are currently available.

6 Claims, 2 Drawing Sheets

5,561,843

MOBILE RADIO COMMUNICATIONS SYSTEM

This invention relates to mobile radio communications systems and in particular to the allocation of channels to mobile subscribers in such systems.

BACKGROUND OF THE INVENTION

Mobile communications systems are currently being developed to accommodate both the original FCC allocated spectrum, i.e. channels 1 to 666 for non-expanded spectrum (NES) use, and the additional FCC allocated spectrum, i.e. channels 667 to 799 and 991 to 1023 for expanded spectrum (ES) use. When a mobile subscriber wishes to make a call, a channel request is initiated so that a free channel can then be allocated to the mobile. In a practical system, particularly under busy conditions, a large number of channel requests will be made and these requests need to be queued to await processing. In current systems servicing both expanded spectrum (ES) and non-expanded spectrum (NES) mobiles, channel allocation is effected in the following way. The ES and NES mobiles making channel requests are placed in separate queues based on the time order in which the requests were made. For NES mobile requests only the NES channel queues are searched to find a free channel. For ES mobile requests however, both the ES and NES channel queues are searched, i.e. a NES channel is allocated only if all the ES channels are busy. This results in the ES channels being used at a much higher rate than the NES channels. During busy hours excessive interference can occur within the more heavily used expanded spectrum causing a consequent reduction in the perceived quality of service.

OBJECT OF THE INVENTION

It is an object of the invention to minimise or overcome the above disadvantage.

It is a further object of the invention to provide an improved method of channel allocation in a mobile communications system accommodating both ES and NES mobiles.

SUMMARY OF THE INVENTION

The invention provides a method allocating channels to mobile terminals in a cellular radio communications system accommodating expanded spectrum (ES) terminals and non expanded spectrum (NES) terminals, said channels comprising a first set of ES channels and a second set of NES channels. The method includes allocating channel requests from NES mobiles to a first queue for available NES channels; allocating a proportion of channel requests from ES mobiles to said first queue for available NES channels; allocating the remainder of the channel requests from the ES mobiles to a second queue for available ES channels; and responding to channel requests from ES mobiles in said first queue by searching in order the NES channels and the ES channels so as to allocate available channels in response to said requests.

Advantageously, a subset of NES channels is reserved primarily for use by NES mobiles to ensure fair allocation of channels between the two types of user, these channels being allocated to ES mobiles only if no other channels are currently available.

The relative proportions of the ES channel requests allocated to the one or the other channel queue may be based on the relative numbers of the two types of channel. The allocation is preferably on a random basis.

BRIEF DESCRIPTION OF THE DRAWINGS

An embodiment of the invention will now be described with reference to the accompanying drawings in which.

DETAILED DESCRIPTION OF THE PREFERRED EMBODIMENT

Figure 1:
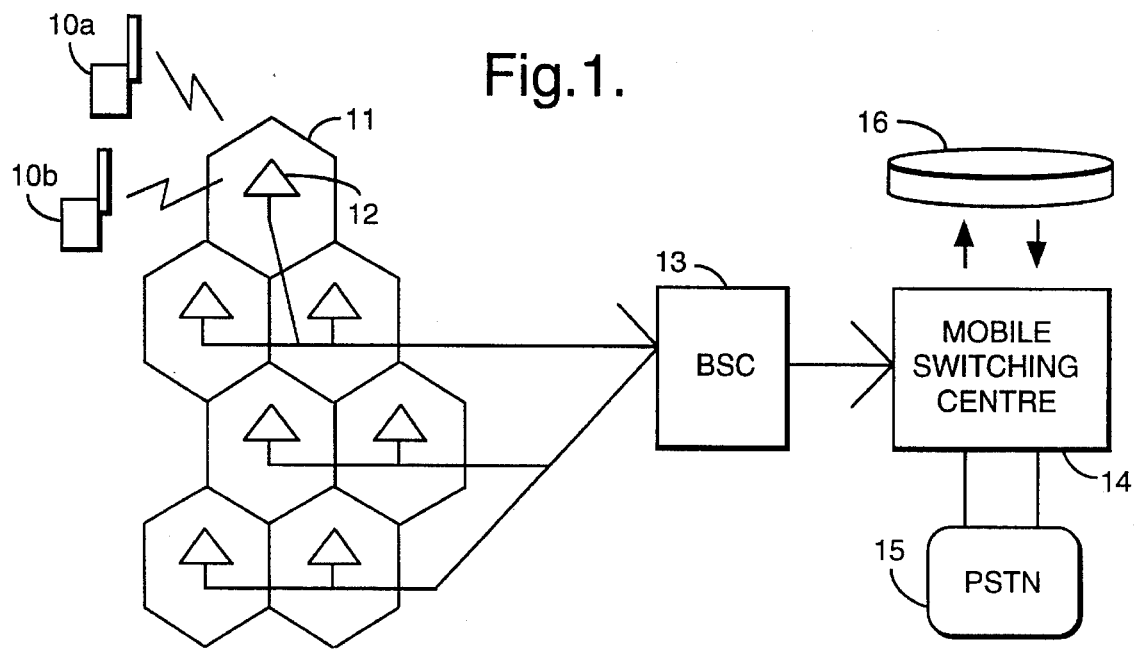
FIG. 1 is a schematic diagram of a mobile communications system servicing both ES and NES mobiles.

Referring to FIG. 1, there is depicted in highly schematic form part of a mobile cellular communications network or system. The service area of the system is subdivided into a plurality of contiguous cells 11 in each of which mobile terminals 10a, 10b, are serviced via a respective base station 12. The mobile terminals comprise expanded spectrum (ES) terminals 10a and non-expanded spectrum (NES) terminals 10b. Operation of a group of base stations 12 is controlled via a base station controller 13 and, in turn, a number of base station controllers are serviced by a mobile switching centre 14 which may provide an interface to the public telecommunications network 15. With this arrangement, the mobile switching centre 14 may service, via the base station controllers 13 and the base stations 12, over one hundred individual cells 11. Information relating to the mobiles 10a, 10b within the service area of the mobile switching centre 14 is stored in a visitors location register 16 associated with the switching centre. A mobile 10a or 10b wishing to make a call transmits a channel request which enters an ES or NES channel queue in time order with similar requests. Communications channels are allocated in response to the queued requests from a first set of expanded spectrum channels and a second set of non-expanded spectrum channels as will be described below.

Figure 3:
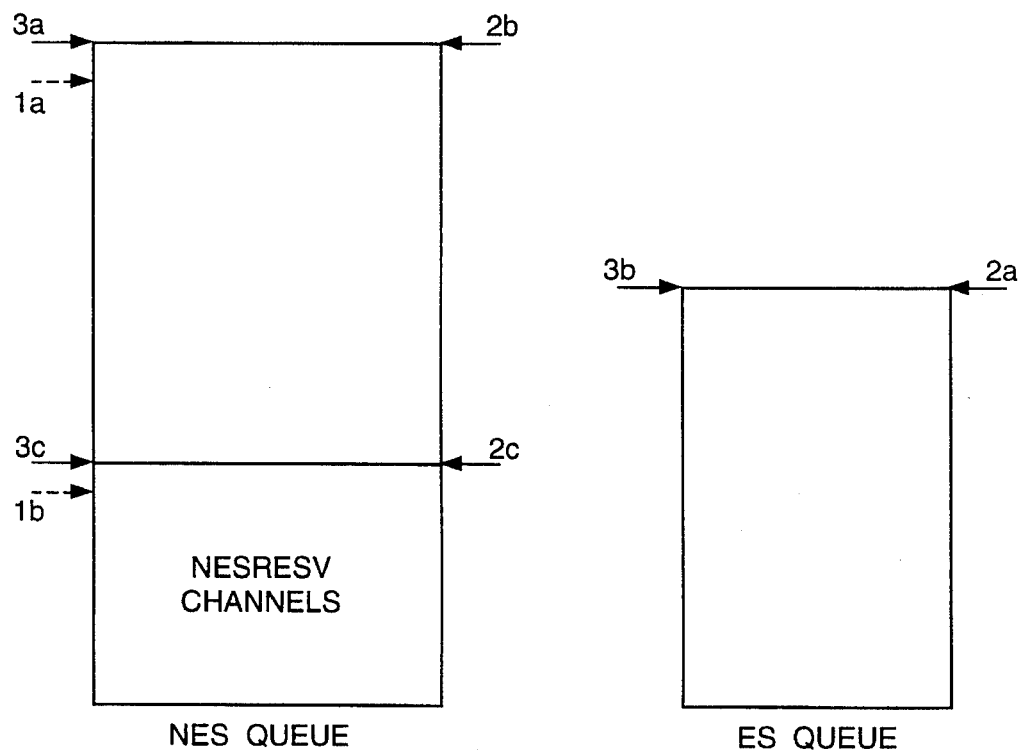
FIG. 3 illustrates in schematic form the allocation of the communications channel resources of the system of FIG. 1.
Figure 2:
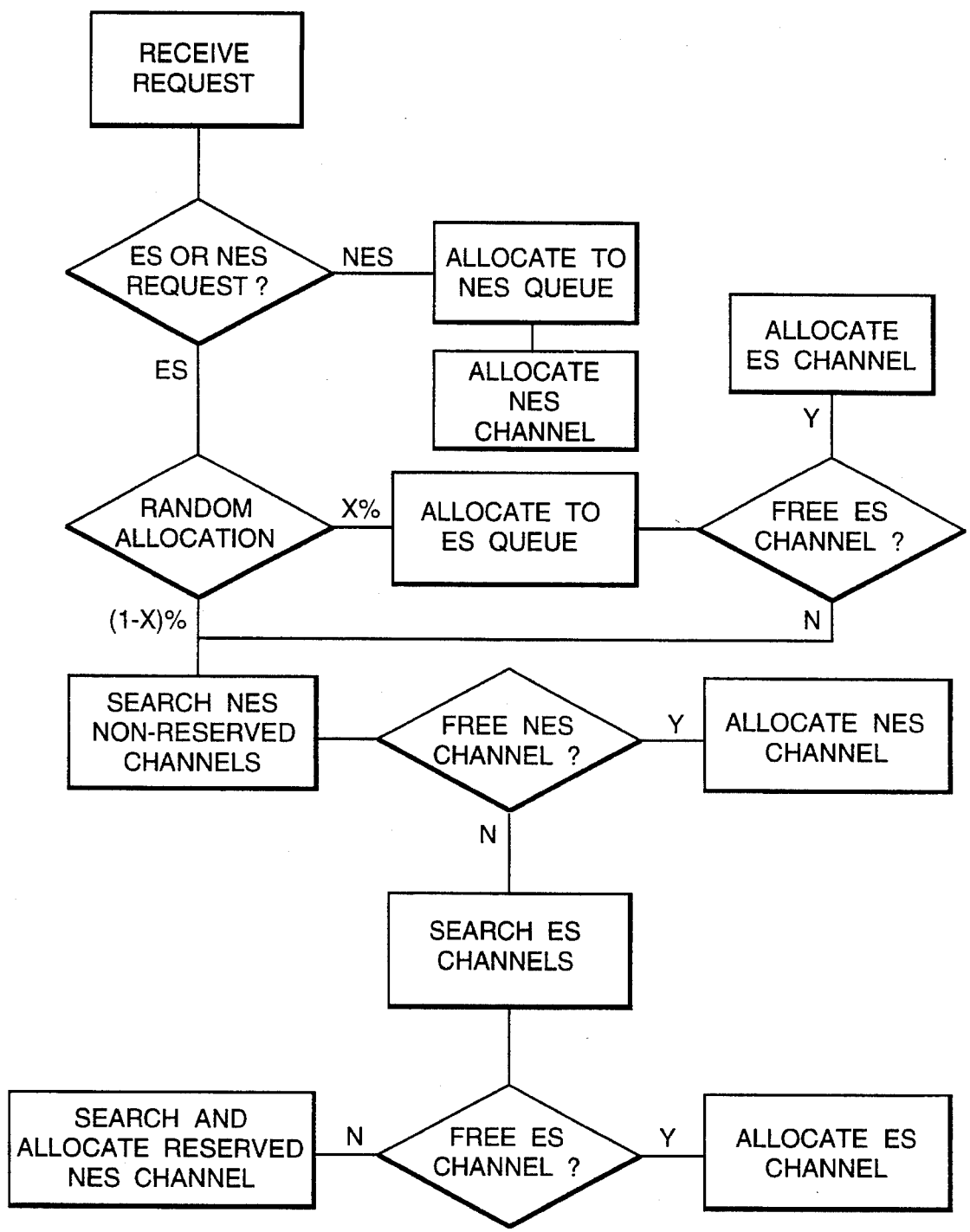
FIG. 2 is a flow chart illustrating the processing of ES and NES channel requests.

Referring now to FIGS. 2 and 3, there are two kinds of channel requests in the mobile communications system of FIG. 1. These are NES mobile requests and ES mobile requests, these requests being handled separately. It is only the ES mobile requests that are affected by our channel allocation algorithm, the NES requests being processed in order by the allocation of the next available NES channel. For the purposes of explanation however, the processing of both classes of requests will be described below.

In the channel allocation scheme detailed in FIG. 2, which shows a schematic diagram or flow chart of the channel allocation process, a random distribution algorithm is used for processing ES mobile requests. Based on a predetermined probability value, a search order for channel allocation is assigned for these channel requests. This probability value is used to define the chance that the NES channel queues should be searched first or the ES channel queues should be searched first to find a free channel. Each ES mobile request is thus randomly assigned to one or the other of the two channel queues. An estimated probability value for this queue allocation may be calculated from the total available channels in the entire NES and ES. In a typical example where there are 333 NES channels and 83 ES channels (a total of 416 channels), the distribution channel queue allocations for ES mobile requests is 80% (333/416), on average, using NES channels and 20% (83/416) using ES channels. This probability value can be adjusted or weighted if necessary to meet individual cellular office needs.

It is preferred that the NES to ES ratio should not exceed 80% to prevent overuse of the NES channels with a consequent risk of interference and the denial of a significant number of NES channel requests.

To reduce the possibility that a NES mobile request is denied while there are ES channel resources available, a new variable, non-expanded Spectrum Reserved (NESRESV), may be introduced. NESRESV is used to ensure that the NES only mobiles have a fair chance to compete for the resources with the ES capable mobiles. NESRESV is defined as the percentage of in-service non-expanded Spectrum (NES) voice channels which are reserved for NES only mobiles. These are reserved NES resources which are not used for expanded spectrum (ES) mobiles unless all the available ES channels and unreserved NES channels have been exhausted.

The optimal value of NESRESV is dependent on a number of factors such as the number of ES and NES mobiles in the system, the sequence in which the ES and NES channel requests are made, the size of the channel queues and the number of ES and NES calls at different times. This optimal value can be different from office to office, or even from cell to cell. As an initial approximation, the optimal value of NESRESV may be estimated from the ratio of tile total number of registered NES mobiles and the total number of registered ES mobiles in the system. This initial estimate may then be evaluated by determining the number of NES channel requests that are refused as a result of non-availability of an NES channel at the same time that ES channels are free. If this number is zero, or close to zero then the value of NESRESV is considered optimum. If however there is a significant number of NES refusals then this is an indication that the value of NESRESV is less than optimum and should thus be increased.

FIG. 3 illustrates the allocation of the ES and NES channel resources to requesting mobiles. In FIG. 3 there are two channel request queues, the NES and ES queues. The shaded part of the NES queue indicates the NES reserve channels. Each solid arrow and the number beside it is used to indicate the searching order for ES capable mobile requests. Each dotted arrow and the number and the number beside it is used to indicate the search order for NES only mobile request.

The NES and ES channel requests are processed in the following way:

NES mobile requests:

A channel is allocated from the NES queues according to the request specification. The unreserved NES channels (FIG. 3) are searched first as indicated by the dotted arrow 1a. If no unreserved channel is available, then the reserved (NESREV) channels are searched as indicated by the dotted arrow 1b ES mobile requests:

Depending on the random distribution of the ES channel requests, a search order is assigned to each request, either the ES channels to be searched first or the NES channels to be searched first as indicated in the flow chart of FIG. 2. If the ES channel request is assigned to the ES channel queue, then the ES channels (FIG. 3) are searched first as indicated by the arrow 2a. If no ES channels are currently available, then the NES channels will be searched commencing with the unreserved channels as indicated by the arrow 2b and finally the reserved channels as indicated by the arrow 2c. A reserved channel will be allocated to a requesting ES mobile only if no unreserved channels are currently available.

In the case that NES channels are searched first, i.e. where the ES request has been allocated to the NES queue (FIG. 2), then the initial search of the NES channels (FIG. 3) is limited to the unreserved channels as indicated by the arrow 3a. The NES channel queues are searched but the NESRESV boundary will not be crossed. If no unreserved NES channels are currently available, then the search is switched to the ES channels. If no ES channels are currently available, then the reserved NES channels will be searched. (FIG. 3) for an available channel for allocation to the requesting ES mobile. Thus, a reserved NES channel is allocated to a requesting ES mobile allocated to the NES queue only if no unreserved NES channels and no ES channels are currently available.

The random allocation of an ES channel request to one or the other of the two search orders may be achieved by generating a random number for each request. There are a number of ways in which this can be achieved. In our system we prefer to employ the timing of each ES channel request for the basis of this randomisation as these events occur on an essentially random basis. For each ES channel request, the time of the request in milliseconds as determined by the system clock is divided by 100 to provide a remainder in the range 0 to 99, this remainder being effectively a random number which can then be used as a basis for search order allocation. For example, if it is required to allocate 20% of the ES requests to the NES queue, then all requests for which the remainder from the division procedure is in the range 0 to 19 can be allocated to the NES queue and all other requests for which the remainder lies in the range 20 to 99 can be allocated to the ES queue.

The channel request allocation technique described above has been found to provide a significant reduction in interference within the expanded spectrum in comparison with, the conventional channel allocation technique while not unduly limiting the availability of NES channels to NES mobile terminals.

We claim:

1. A method of allocating channels to mobile terminals in a cellular radio communications system accommodating expanded spectrum (ES) terminals and non expanded spectrum (NES) terminals, said channels comprising a first set of ES channels and a second set of NES channels; the method including, allocating channel requests from NES mobiles to a first queue for available NES channels;

allocating a proportion of channel requests from ES mobiles to said first queue for available NES channels;

allocating the remainder of the channel requests from the ES mobiles to a second queue for available ES channels;

and responding to channel requests from ES mobiles in said first queue by searching in order the NES channels and the ES channels so as to allocate available channels in response to said requests.

2. A method of allocating channels to mobile terminals in a cellular radio communications system accommodating expanded spectrum (ES) terminals and non expanded spectrum (NES) terminals, said channels comprising a first set of ES channels and a second set of NES channels; the method including the steps of, defining a subset of said NES channels as reserved channels for use by NES terminals;

allocating channel requests from NES mobiles to a first queue for available NES channels;

allocating a proportion of channel requests from ES mobiles to said first queue for available NES channels;

allocating the remainder of the channel requests from the ES mobiles to a second queue for available ES channels;

and responding to channel requests from ES mobiles in said first queue by searching, in order, the unreserved NES channels, the ES channels and the reserved NES channels so as to allocate available channels in response to said requests.

3. A method as claimed in claim 2, wherein channel requests from ES mobiles in said second queue are responded to by searching, in order, the ES channels, the NES unreserved channels and the NES reserved channels so as to allocate available channels in response to said requests.

4. A method as claimed in claim 3, wherein the proportion of ES channel requests allocated to the first queue corresponds to the relative numbers of ES and NES channels.

5. A method as claimed in claim 4, wherein allocation of said ES channel requests to said first queue is effected on a substantially random basis.

6. A method as claimed in claim 5, wherein said random allocation is determined from the timing of each said ES channel request.

* * * * *